(12) United States Patent
Sekiguchi

(10) Patent No.: US 12,056,064 B2
(45) Date of Patent: Aug. 6, 2024

(54) INFORMATION PROCESSING APPARATUS, CONTROL METHOD OF THE SAME, AND STORAGE MEDIUM

(71) Applicant: CANON KABUSHIKI KAISHA, Tokyo (JP)

(72) Inventor: Shiho Sekiguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/054,820

(22) Filed: Nov. 11, 2022

(65) Prior Publication Data

US 2023/0161717 A1      May 25, 2023

(30) Foreign Application Priority Data

Nov. 19, 2021   (JP) .................... 2021-189028

(51) Int. Cl.
*G06F 13/10*      (2006.01)
(52) U.S. Cl.
CPC .......... *G06F 13/10* (2013.01); *G06F 2213/40* (2013.01)
(58) Field of Classification Search
CPC .............................. G06F 13/10; G06F 2213/40
See application file for complete search history.

(56) References Cited

U.S. PATENT DOCUMENTS

| | | | |
|---|---|---|---|
| 2014/0115202 A1* | 4/2014 | Yoshinaga | G06F 13/426 710/62 |
| 2019/0227757 A1* | 7/2019 | Kimura | G06F 3/1236 |
| 2020/0177679 A1* | 6/2020 | Liu | H04L 67/141 |
| 2021/0240293 A1* | 8/2021 | Van Ostrand | G06F 3/041662 |

FOREIGN PATENT DOCUMENTS

JP       4770670 B2       9/2011

* cited by examiner

*Primary Examiner* — Zachary K Huson
(74) *Attorney, Agent, or Firm* — Canon U.S.A., Inc. I.P. Division

(57) ABSTRACT

A storage medium storing a program for causing a computer to execute first determination of determining, in a case where information regarding a communication apparatus is acquired via communication with the communication apparatus using a first connection method, that communication using the first connection method is enabled by the communication apparatus, and determining, based on information included in the information acquired in first acquisition and indicating a state in which communication using a second connection method different from the first connection method is enabled by the communication apparatus, that the communication using the second connection method is enabled by the communication apparatus.

19 Claims, 8 Drawing Sheets

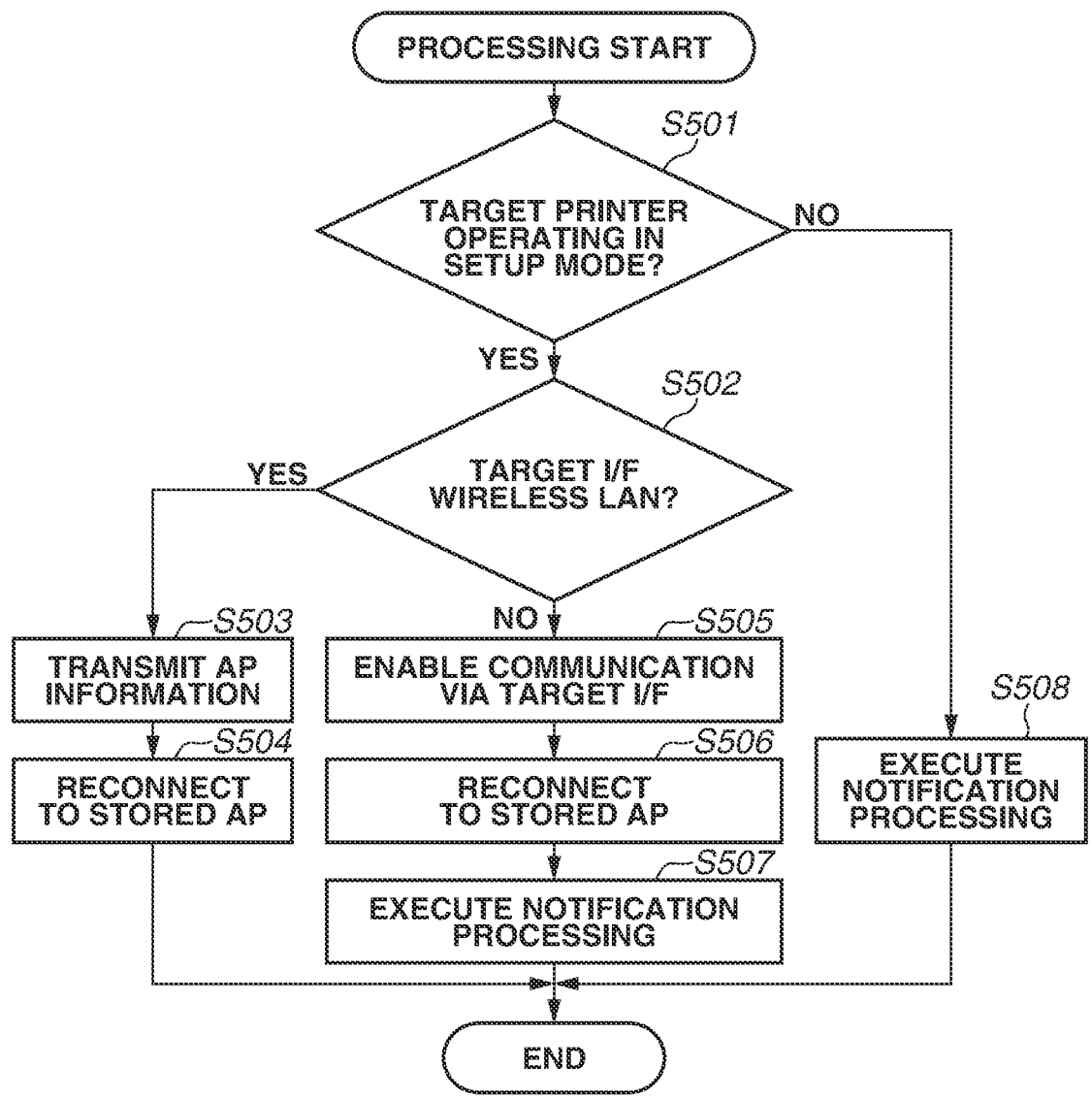

INFORMATION PROCESSING APPARATUS, CONTROL METHOD OF THE SAME, AND STORAGE MEDIUM

BACKGROUND

Field

A present disclosure relates to an information processing apparatus, a control method of the information processing apparatus, and a storage medium.

Description of the Related Art

In some cases, a communication apparatus (for example, printer) performs an initial setting (for example, installation of a printer driver) to output print data from an information processing apparatus to the communication apparatus via an available connection method.

Japanese Patent No. 4770670 discusses a technique of installing a printer driver suitable for a protocol supported by a communication apparatus.

There has been a demand for further enhancement in convenience of settings relating to communication processing with a communication apparatus.

SUMMARY

According to various embodiments of the present disclosure, a storage medium storing a program for causing a computer of an information processing apparatus to execute a process is provided, the information processing apparatus capable of executing communication with a communication apparatus that can execute communication using a connection method of which enabling and disabling can be switched by a user. The process including first acquisition of acquiring, via communication with the communication apparatus using a first connection method, information regarding at least one connection method to be used in communication with the communication apparatus, and first determination of determining, in a case where information regarding the communication apparatus is acquired via the communication with the communication apparatus using the first connection method, that communication using the first connection method is enabled by the communication apparatus, and determining, based on information included in the information acquired in the first acquisition and indicating a state in which communication using a second connection method different from the first connection method is enabled by the communication apparatus, that the communication using the second connection method is enabled by the communication apparatus.

Further features of the present disclosure will become apparent from the following description of example embodiments with reference to the attached drawings.

BRIEF DESCRIPTION OF THE DRAWINGS

FIG. 5 is a flowchart illustrating processing of connecting with a communication apparatus via a target I/F.

DESCRIPTION OF THE EMBODIMENTS

Hereinafter, example embodiments of the present disclosure will be described with reference to the drawings. The following example embodiments appropriately modified or improved based on the common knowledge of one skilled in the art without departing from the spirit of the present invention are also interpreted as falling within the scope of the present invention.

An information processing apparatus and a communication apparatus that are included in a communication system according to the present example embodiment will be described. In the present example embodiment, a personal computer (PC) is exemplified as an information processing apparatus, but the information processing apparatus is not limited to the example. For example, various devices, such as a smartphone, a mobile terminal, a tablet terminal, a personal digital assistant (PDA), or a digital camera, can be used as the information processing apparatus. In the present example embodiment, a multifunction printer (hereinafter, will be referred to as a multifunction peripheral (MFP)) that can provide a copy service, a facsimile (FAX) service, and a print service is exemplified as a communication apparatus, but the communication apparatus is not limited to the examples. Various apparatuses can be used as long as the apparatuses can perform wireless communication with an information processing apparatus. For example, in a case where the communication apparatus is a printer, an inkjet printer, a full-color laser beam printer, or a monochrome printer can be used as the communication apparatus. The communication apparatus is not limited to printers. A copier, a facsimile device, a mobile terminal, a smartphone, a laptop PC, a tablet terminal, a PDA, a digital camera, a music reproduction device, a television, or a smart speaker can also be used as the communication apparatus. Aside from the examples, a multifunction peripheral including a plurality of functions, such as a copy function, a FAX function, and a print function can also be used as the communication apparatus. The smart speaker is a device for issuing a processing instruction to a device existing in the same network, in accordance with voice let out by a user, and notifying the user of information acquired via the network, in response to voice let out by the user. Aside from these, a single-function printer (hereinafter, will be referred to as an SFP) including a single function can also be used as the communication apparatus.

Figure 1:
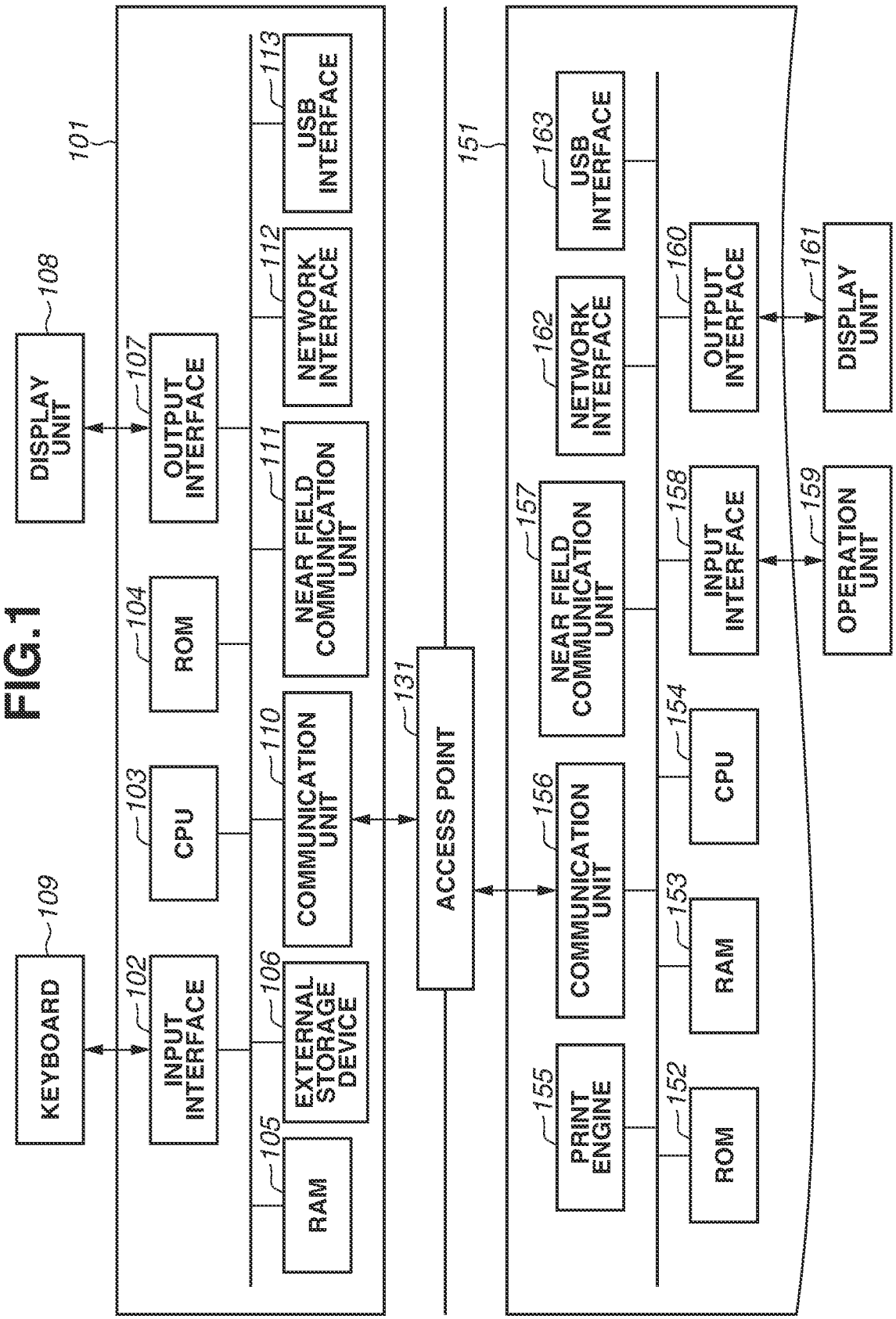
FIG. 1 is a system configuration diagram.

A configuration of an information processing apparatus according to the present example embodiment, and a configuration of a communication apparatus that can communicate with the information processing apparatus according to the present example embodiment will be described with reference to a block diagram illustrated in FIG. 1. While, in the present example embodiment, the following configuration will be described as an example, the present example embodiment is applicable to apparatuses that can communicate with a communication apparatus, and thus the functions are not specifically limited to those illustrated in FIG. 1.

An information processing apparatus 101 is an information processing apparatus according to the present example embodiment. The information processing apparatus 101 includes an input interface 102, a central processing unit (CPU) 103, a read-only memory (ROM) 104, a random access memory (RAM) 105, an external storage device 106, an output interface 107, a display unit 108, a keyboard 109, a communication unit 110, a near field communication unit 111, a network interface 112, and a universal serial bus (USB) interface 113. A computer of the information processing apparatus 101 is formed by the CPU 103, the ROM 104, and the RAM 105.

The input interface 102 is an interface for receiving a data input and an operation instruction from a user operating an operation unit, such as the keyboard 109. The operation unit can be a physical keyboard or a physical button, or can be a software keyboard or a software button that is displayed on the display unit 108. In other words, the input interface 102 can receive an input (operation) from the user via the display unit 108.

The CPU 103 is a system control unit and controls the entire information processing apparatus 101.

The ROM 104 stores fixed data, such as control programs to be executed by the CPU 103, data tables, and an embedded operating system (hereinafter, will be referred to as an OS) program. In the present example embodiment, each control program stored in the ROM 104 performs software execution control, such as scheduling, task switch, and interrupt processing, under the control of an embedded OS stored in the ROM 104.

The RAM 105 includes a static random access memory (SRAM) requiring a backup power source. Because data is held in the RAM 105 using a primary battery for data backup (not illustrated), the RAM 105 can store important data, such as program control variables, without volatilizing the data. The RAM 105 is also provided with a memory area in which setting information on the information processing apparatus 101 and management data of the information processing apparatus 101 are stored. The RAM 105 is also used as a main memory and a work memory of the CPU 103.

The external storage device 106 stores an application program (hereinafter, will be referred to as a setting application) for execution of setting processing of a communication apparatus 151, and a print information generation program for generation of print information interpretable by the communication apparatus 151. For example, the setting application is a program for execution of printer driver install processing and print queue generation processing, which serve as initial setting processing, via a connection interface (I/F) selected by the user. The setting application can include another function other than the execution of the initial setting processing. For example, the setting application can include a function of causing the communication apparatus 151 to execute printing, a function of causing the communication apparatus 151 to scan a document set on the communication apparatus 151, and a function of checking the state of the communication apparatus 151. The setting application is installed from an external server and stored into the external storage device 106 by internet communication via the communication unit 110, for example. The external storage device 106 stores various programs, such as transmission/reception control programs for information to be transmitted to and received from the communication apparatus 151 connected via the communication unit 110, and various types of information to be used by the programs.

The output interface 107 is an interface that controls the display unit 108 to display data and notify the user of the state of the information processing apparatus 101.

The display unit 108 includes a light emitting diode (LED) and a liquid crystal display (LCD), and displays data and notifies the user of the state of the information processing apparatus 101.

The communication unit 110 is a component for connecting with an apparatus, such as the communication apparatus 151 and an access point (AP) 131, and executing data communication. For example, the communication unit 110 can connect to an access point (not illustrated) in the communication apparatus 151. When the communication unit 110 and the access point in the communication apparatus 151 connect with each other, the information processing apparatus 101 and the communication apparatus 151 become ready to communicate with each other. The communication unit 110 can directly communicate with the communication apparatus 151 via wireless communication, or can communicate with the communication apparatus 151 via an external apparatus existing on the outside of the information processing apparatus 101 and on the outside of the communication apparatus 151. Examples of the external apparatus include an external access point (access point 131, etc.) outside the information processing apparatus 101 and the communication apparatus 151, and an apparatus that is other than an access point and is capable of relay communication. In the present example embodiment, a wireless communication method that is used by the communication unit 110 is Wireless Fidelity (Wi-Fi) (registered trademark), which is a communication standard complying with an Institute of Electrical and Electronics Engineers (IEEE) 802.11 series communication standard. Examples of the access point 131 include devices, such as a wireless local area network (LAN) router. In the present example embodiment, a method by which the information processing apparatus 101 and the communication apparatus 151 directly connect with each other not via an external access point will be referred to as a direct connection method. A method by which the information processing apparatus 101 and the communication apparatus 151 connect with each other via an external access point will be referred to as an infrastructure connection method.

The near field communication unit 111 is a component for performing near field communication with an apparatus, such as the communication apparatus 151, and executing data communication, and performs communication using a communication method different from a communication method of the communication unit 110. The near field communication unit 111 can connect with a near field communication unit 157 in the communication apparatus 151, for example. Examples of communication methods include Near Field Communication (NFC), Bluetooth® Classic, Bluetooth® Low Energy (Bluetooth® LE), and Wi-Fi Aware.

The network interface 112 controls wireless communication processing and wired communication processing using a wired LAN cable. Specifically, the network interface 112 is an interface for connecting with the communication apparatus 151 or an external apparatus outside the information processing apparatus 101 and the communication apparatus 151, wirelessly or via a wired LAN, and executing data communication. For example, the network interface 112 can connect to an access point (not illustrated) in the communication apparatus 151. When the network interface 112 and the access point in the communication apparatus 151 connects with each other, the information processing apparatus 101 and the communication apparatus 151 become ready to communicate with each other. The network interface 112 can be the network interface 112 dedicated for wireless communication, or can be the network interface 112 dedicated for wired communication. In the latter case, the information processing apparatus 101 may not include the network interface 112 dedicated for wireless communication. In other words, the information processing apparatus 101 can include the network interface 112 dedicated for wired communication, and the USB interface 113 to be described below, for example, as interfaces for communicating with another apparatus.

The USB interface 113 controls USB connection established via a USB cable. Specifically, the USB interface 113 is an interface for connecting with an apparatus, such as the communication apparatus 151 and the access point 131, via a USB, and executing data communication.

In the present example embodiment, the information processing apparatus 101 can execute network setup processing of another apparatus. The network setup processing of another apparatus is processing of connecting another apparatus with an access point that forms a network. Specifically, the information processing apparatus 101 transmits connection information on an access point to the communication apparatus 151 via Wi-Fi connection established between the information processing apparatus 101 and the communication apparatus 151 operating in a network setup mode to be described below. Then, the communication apparatus 151 can connect to a network formed by the access point, by connecting to the access point using the received connection information on the access point. In the present example embodiment, a communication method that is used in the network setup processing is Wi-Fi communication, but the communication method is not limited to the example. For example, network setup may be executed by a communication method other than Wi-Fi communication, such as Bluetooth® LE.

The communication apparatus 151 is a communication apparatus according to the present example embodiment. The communication apparatus 151 includes a ROM 152, a RAM 153, a CPU 154, a print engine 155, a communication unit 156, the near field communication unit 157, an input interface 158, an operation unit 159, an output interface 160, a display unit 161, a network interface 162, and a USB interface 163. A computer of the communication apparatus 151 is formed by the ROM 152, the RAM 153, and the CPU 154.

The communication unit 156 controls communication processing executed via each interface. The communication apparatus 151 according to the present example embodiment can operate in an infrastructure mode and a Peer to Peer (P2P) mode as modes for performing communication via the communication unit 156.

The infrastructure mode is a mode in which the communication apparatus 151 communicates with another apparatus, such as the information processing apparatus 101, via an external apparatus (for example, the access point 131) that forms a network. Connection with an external access point that is established by the communication apparatus 151 operating in the infrastructure mode will be hereinafter referred to as infrastructure connection. In the infrastructure connection in the present example embodiment, the communication apparatus 151 operates as a child station and an external access point operates as a parent station. In the present example embodiment, the parent station is an apparatus that determines a communication channel to be used in a network to which the parent station belongs, and the child station is an apparatus that does not determine a communication channel to be used in a network to which the child station belongs, and uses a communication channel determined by the parent station.

The P2P mode is a configuration in which the communication apparatus 151 directly communicates with another apparatus, such as the information processing apparatus 101, not via an external apparatus that forms a network. In the present example embodiment, the P2P mode includes an AP mode in which the communication apparatus 151 operates as an access point. Connection information (service set identifier (SSID) and a password) on an access point activated in the communication apparatus 151 in the AP mode can be set by the user. The P2P mode can include a Wi-Fi Direct (WFD) mode in which the communication apparatus 151 executes communication via WFD, for example. From among a plurality of WFD-compliant devices, a device that is to operate as a parent station is determined in accordance with a sequence called Group Owner Negotiation, for example. The parent station can be determined without the execution of the Group Owner Negotiation. In particular, an apparatus that is a WFD-compliant device and plays a role as a parent station is called a Group Owner. Direct connection with another apparatus that is established by the communication apparatus 151 operating in the P2P mode will be referred to as direct connection. In the direct connection in the present example embodiment, the communication apparatus 151 operates as a parent station and other apparatuses operate as child stations.

In the present example embodiment, by receiving a predetermined operation from the user, the communication apparatus 151 can operate in a network setup mode, which is a mode for network setup of the communication apparatus 151. In a case where the communication apparatus 151 operates in the network setup mode, by using the communication unit 156, the communication apparatus 151 operates as a setup access point activated during the operation in the network setup mode. The setup access point is an access point different from an access point activated in the above-described AP mode. An SSID of the setup access point includes a predetermined character string which is recognizable by a setting application of the information processing apparatus 101.

The setup access point is an access point not requiring a password in establishing connection. The communication apparatus 151 operating in the network setup mode uses a predetermined communication protocol (setup communication protocol) in communication with the information processing apparatus 101 connecting with the setup access point. Specifically, the setup communication protocol is a Simple Network Management Protocol (SNMP), for example. After a predetermined time elapses from the start of an operation in the network setup mode, the communication apparatus 151 stops the operation in the network setup mode and deactivates the setup access point. This is because, since the setup access point is an access point not requiring a password as described above, long-time activation of the setup access point increases a possibility that a connection request is issued from an inappropriate apparatus. The setup access point can be an access point requiring a password. In this case, a password to be used in establishing connection with the setup access point is a fixed password (unchangeable by the user) that is preliminarily recognized by a setting application.

The near field communication unit 157 is a component for performing near field communication with an apparatus, such as the information processing apparatus 101. The near field communication unit 157 can connect with the near field communication unit 111 in the information processing apparatus 101, for example. Examples of communication methods include NFC, Bluetooth® Classic, Bluetooth® LE, and Wi-Fi Aware.

The RAM 153 includes an SRAM that uses a backup power source. Because data is held in the RAM 153 using a primary battery for data backup (not illustrated), the RAM 153 can store important data, such as program control variables, without volatilizing the data. The RAM 153 is also provided with a memory area to store setting information on the communication apparatus 151 and management data of the communication apparatus 151. The RAM 153 is also used as a main memory and a work memory of the CPU 154, and serves as a receive buffer to temporarily store printing information received from the information processing apparatus 101, and stores various types of information.

The ROM 152 stores fixed data, such as control programs to be executed by the CPU 154, data tables, and an OS program. In the present example embodiment, each control program stored in the ROM 152 performs software execution control, such as scheduling, task switch, and interrupt processing, under the control of an embedded OS stored in the ROM 152.

The CPU 154 is a system control unit and controls the entire communication apparatus 151.

Based on information stored in the RAM 153 or a print job received from the information processing apparatus 101, the print engine 155 forms an image on a recording medium, such as paper, by adding recording material, such as ink, to the recording medium, and outputs a printed result. Because a print job to be transmitted from the information processing apparatus 101 generally has a large data amount, a communication method that enables high-speed communication is desired to be used in the communication of the print job. The communication apparatus 151 thus receives the print job via the communication unit 156 that can perform communication at higher speed than the near field communication unit 157.

A memory, such as an external hard disk drive (HDD) or a secure digital (SD) card, can be attached to the communication apparatus 151 as an optional device, and information stored in the communication apparatus 151 can be stored in the memory.

The input interface 158 is an interface for receiving a data input and an operation instruction from the user by the operation unit 159, such as a physical button, being operated. The operation unit 159 can be a software keyboard or a software button that is displayed on the display unit 161.

In other words, the input interface 158 can receive an input from the user via the display unit 161.

The output interface 160 is an interface that controls the display unit 161 to display data and notify the user of the state of the communication apparatus 151.

The display unit 161 includes an LED and an LCD, and displays data and notifies the user of the state of the communication apparatus 151.

The network interface 162 is an interface that controls wireless communication processing and wired communication processing using a wired LAN cable. Specifically, the network interface 162 includes an access point to connect with an apparatus, such as the information processing apparatus 101, as an access point in the communication apparatus 151. The access point can connect to the network interface 112 of the information processing apparatus 101. When the network interface 162 activates the internal access point, the communication apparatus 151 operates as an access point. The network interface 162 can directly establish wireless connection with the information processing apparatus 101, or can establish wireless connection with the information processing apparatus 101 via the access point 131. In the present example embodiment, a wireless communication method that is used by the network interface 162 is a communication standard complying with an IEEE 802.11 series communication standard. In the following description, the Wi-Fi (registered trademark) (Wi-Fi communication) is a communication standard complying with an IEEE 802.11 series communication standard. The network interface 162 can include hardware functioning as an access point, or can operate as an access point by software for causing the network interface 162 to function as an access point.

The USB interface 163 is an interface that controls USB connection established via a USB cable. Specifically, the USB interface 163 is an interface for connecting with an apparatus, such as the information processing apparatus 101 and an external access point via a USB, and executing data communication.

In the present example embodiment, the information processing apparatus 101 communicates with the communication apparatus 151 via a predetermined connection interface (hereinafter, will be referred to as a connection I/F), and performs a setting to output print data to the communication apparatus 151 (hereinafter, will be referred to as an initial setting). The connection I/F refers to a connection method that is used by the information processing apparatus 101 and the communication apparatus 151 to perform communication. For example, the information processing apparatus 101 communicates with the communication apparatus 151 via a connection I/F of the communication apparatus 151 such as the USB interface 163 and the network (NW) interface 162, and performs initial setting processing. The communication executed with the communication apparatus 151 via the NW interface 162 includes communication with the communication apparatus 151 via a wireless LAN interface, and communication with the communication apparatus 151 via a wired LAN interface. The initial setting processing is processing for enabling print data to be output to the communication apparatus 151, by installing a printer driver compatible with the communication apparatus 151, and generating a print queue. The initial setting processing is implemented by the information processing apparatus 101 communicating with the communication apparatus 151 via a predetermined connection I/F, and acquiring model information of the communication apparatus 151 using a setting application. In a case where the information processing apparatus 101 performs the initial setting processing of the communication apparatus 151 using the setting application, the information processing apparatus 101 displays, on the display unit 108, a notification for selection of a connection I/F to be used when communication with the communication apparatus 151 is executed. Then, in a case where the information processing apparatus 101 receives a selection of a connection I/F from the user, the information processing apparatus 101 executes communication with the communication apparatus 151 via the selected connection I/F, and acquires model information of the communication apparatus 151 using the setting application.

Meanwhile, the communication apparatus 151 can control enabling and disabling of communication via each connection I/F. For example, in a case where the communication apparatus 151 disables wireless communication via the network interface 162, the communication apparatus 151 changes a value indicating a state of the network interface 162, to a value indicating a state in which the network interface is unsupported, and stores the value into the RAM 153. In a case where the communication apparatus 151 disables wireless communication via the network interface 162, similarly to a case where the network interface 162 is not disposed in the communication apparatus 151, it becomes unable to execute communication with the communication apparatus 151 via wireless LAN connection.

Thus, if a connection I/F selected by the user is a predetermined connection I/F via which communication is disabled by the communication apparatus 151, it sometimes becomes unable to execute communication with the communication apparatus 151 via the connection I/F. In addition, since the user cannot recognize a connection I/F via which communication is not disabled by the communication apparatus 151, the user may select a connection I/F via which communication is disabled by the communication apparatus 151.

In view of the foregoing, in the present example embodiment, the information processing apparatus 101 executes notification processing for notifying the user of a connection I/F via which communication is not disabled (is enabled) by the communication apparatus 151, from among connection I/Fs included in (supported by) the communication apparatus 151, in the communication with the communication apparatus 151. This can reduce the possibility that a connection I/F selected by the user is a predetermined connection I/F via which communication is disabled by the communication apparatus 151. Furthermore, since the user can recognize a connection I/F via which communication is not disabled by the communication apparatus 151, it is possible to reduce the possibility of selecting a connection I/F via which communication is disabled by the communication apparatus 151.

Figure 2:
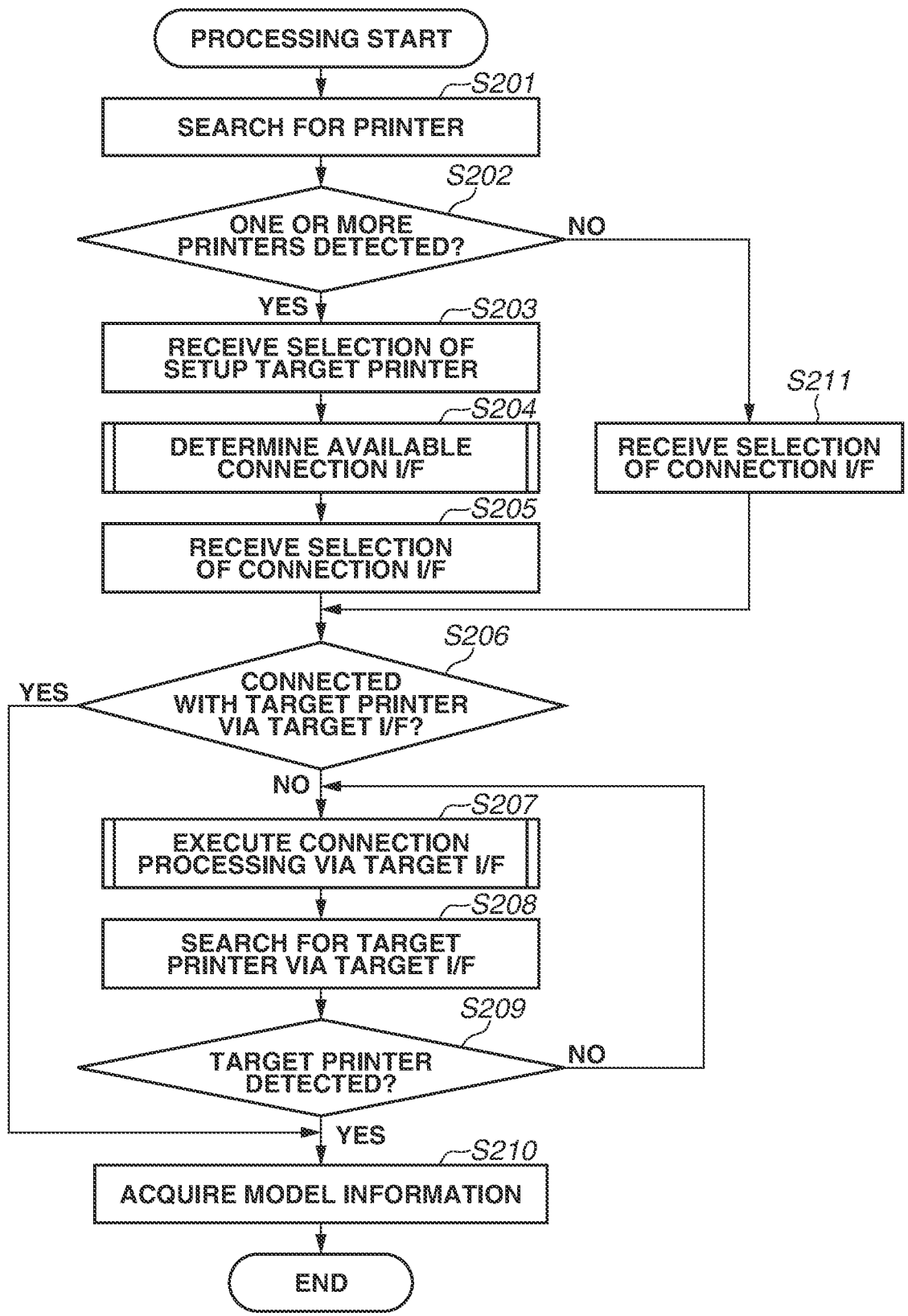
FIG. 2 is a flowchart illustrating initial setting processing to be executed by an information processing apparatus.

FIG. 2 is a flowchart illustrating a procedure of processing that is executed by the information processing apparatus 101 in the initial setting processing according to the present example embodiment. The processing in the flowchart illustrated in FIG. 2 is implemented by the CPU 103 loading a setting application stored in the ROM 104 or the external storage device 106, onto the RAM 105, and executing the setting application, for example. The processing in the flowchart illustrated in FIG. 2 is started in response to a predetermined operation that is performed on a screen displayed by the setting application to execute the initial setting processing (hereinafter, will be referred to as a setting operation).

First of all, in step S201, the CPU 103 instructs an OS of the information processing apparatus 101 to search for the communication apparatus 151 existing around the information processing apparatus 101, and acquires a search result using the setting application.

Specifically, the CPU 103 acquires information regarding the communication apparatus 151 that can communicate with the information processing apparatus 101, using an application program interface (API) of an OS included in the information processing apparatus 101. For example, the communication apparatus 151 to be discovered as the communication apparatus 151 that can communicate with the information processing apparatus 101 is the communication apparatus 151 belonging to a network to which the information processing apparatus 101 belongs (for example, at least one of a network formed by the AP 131, and a network to which the information processing apparatus 101 connects via a wired LAN interface). In a case where the information processing apparatus 101 connects with a communication apparatus not only via the above-described networks but also via a USB cable, the communication apparatus 151 connected via the USB cable is also discovered.

An access point activated by the communication apparatus 151 operating in the network setup mode (the above-described access point in the communication apparatus 151) is also discovered.

Specifically, the setting application preliminarily recognizes that a beacon of an SSID including a predetermined character string is issued from a communication apparatus 151 operating in the network setup mode. Thus, by discovering an SSID including a predetermined character string, the CPU 103 can discover the communication apparatus 151 operating in the network setup mode.

In step S202, the CPU 103 determines whether one or more communication apparatuses 151 have been detected (discovered). Specifically, the CPU 103 determines whether information regarding the communication apparatus 151 that can communicate with the information processing apparatus 101 has been acquired. In a case where the CPU 103 determines that one or more communication apparatuses 151 have been detected (YES in step S202), the processing proceeds to step S203. In a case where the CPU 103 determines that one or more communication apparatuses 151 have not been detected (NO in step S202), the processing proceeds to step S211.

Figure 4A:
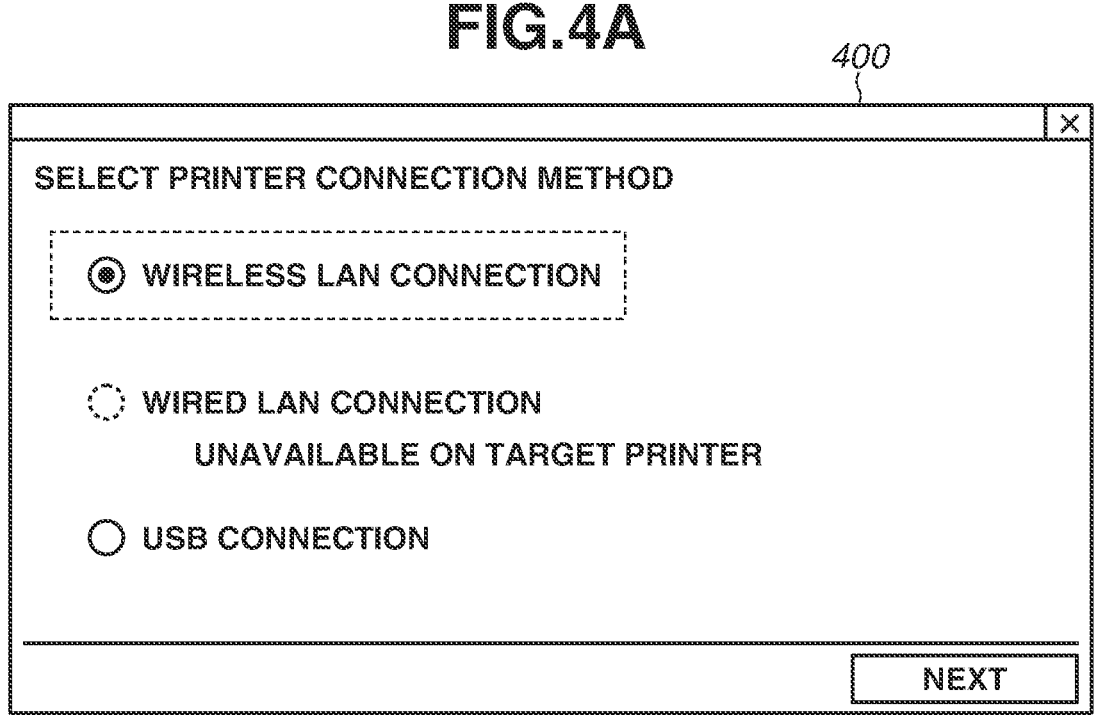
FIGS. 4A and 4B are diagrams each illustrating an example of a connection I/F selection screen.
Figure 4B:
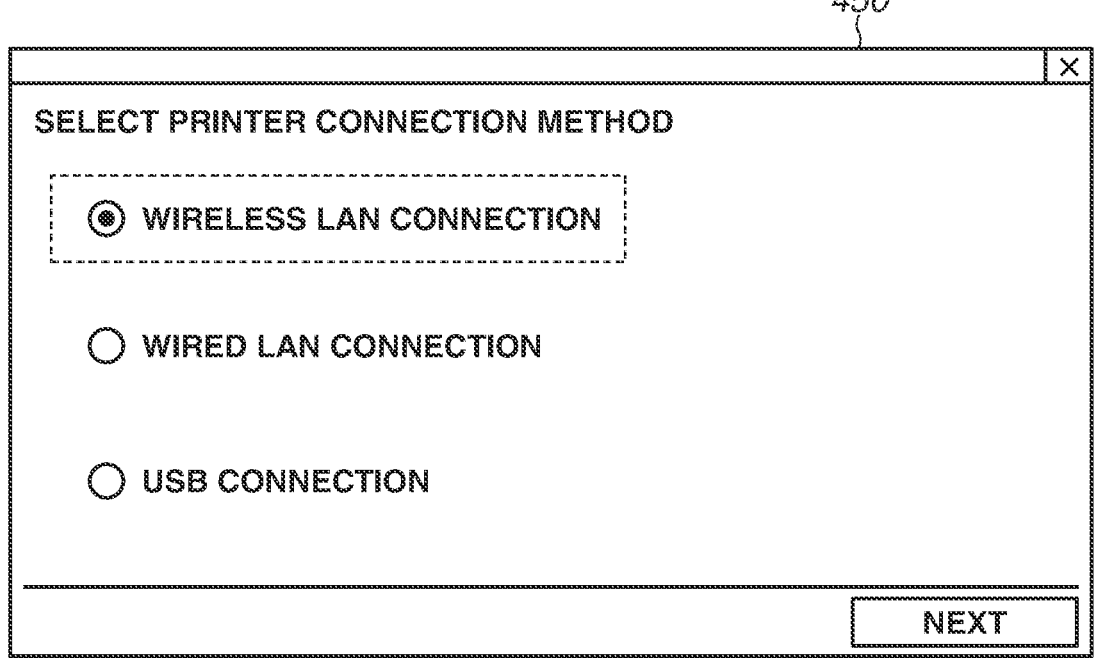

In step S211, the CPU 103 displays, on the display unit 108 (notifies the user of), a connection I/F available to the information processing apparatus 101, and receives a selection of a connection I/F to be used in initial setting processing, from the user. Specifically, the CPU 103 displays a notification screen 450 as illustrated in FIG. 4B, on the display unit 108. The notification screen 450 is a selection screen including radio buttons, but a notification screen that includes a drop-down list or uses another selection method can be displayed.

An I/F selected in step S211 is set as a target I/F. In step S203, the CPU 103 displays a list of the communication apparatuses 151 with which the information processing apparatus 101 can perform communication, on the display unit 108 using the information acquired in step S201. In some cases, the information processing apparatus 101 does not include the network interface 112 for wireless communication, or the network interface 112 for wired communication connects with none of the communication apparatuses 151. In such a case, if a USB interface is included in the information processing apparatus 101, the communication apparatus 151 connected via the USB interface 113 can be displayed in the list. Then, the CPU 103 receives a selection of the communication apparatus 151 from the user. The CPU 103 determines the communication apparatus 151 selected from the displayed list, as an apparatus to be targeted in initial setting processing (hereinafter, will be referred to as a target communication apparatus 151). The communication apparatus 151 discovered by communication via the network interface 112 and the communication apparatus 151 discovered by communication via the USB interface 113 can be displayed in a distinguishable manner.

In step S204, the CPU 103 performs processing of determining a connection I/F available on the target communication apparatus 151. The processing in step S204 will described below with reference to FIG. 3.

In step S205, the CPU 103 displays, on the display unit 108 (outputs to the display unit 108), a notification for prompting a user to select a connection I/F to be used in communication with the target communication apparatus 151, from among connection I/Fs determined in step S204 as connection I/Fs available on the target communication apparatus 151. The output of the notification can be performed by voice output from an audio unit (not illustrated). A description will be given of a case where the CPU 103 determines in step S204 that wireless LAN connection and USB connection are available and wired LAN connection is unavailable. In this case, in step S205, a notification for prompting the user to select either wireless LAN connection or USB connection is displayed on the display unit 108. That is, a connection I/F determined in step S204 as a connection I/F available on the target communication apparatus 151 becomes selectable in the notification as a connection I/F to be used by the user in communication with the target communication apparatus 151. A message notifying that wired LAN connection is unavailable, and a choice of wired LAN connection that is in an unselectable state are displayed in the notification. The display of the choice of wired LAN connection can be omitted from the notification. In other words, in the notification, a connection I/F determined in step S204 as a connection I/F unavailable on the target communication apparatus 151 becomes unselectable as a connection I/F to be used by the user in communication with the target communication apparatus 151. FIG. 4A illustrates an example of a notification for prompting the user to select a connection I/F determined as a connection I/F available on the target communication apparatus 151. A notification screen 400 is a selection screen including radio buttons. Alternatively, the notification screen 400 can include a drop-down list or use another selection method. In a case where the communication apparatus 151 includes a switch for controlling enabling or disabling of communication via a connection UF, and the user can operate the switch, for example, a description notifying that a switch of a connection I/F unavailable on the communication apparatus 151 is turned off can be displayed on the notification screen 400. Furthermore, the notification screen 400 can include a region for describing the details of an operation for turning on the switch, or a software button for newly displaying the region, for example. In a case where the software button is pressed, for example, the region can be displayed on a web browser as internet content. The switch can be a physical button, or can be a switch that causes control of enabling or disabling of communication via a connection I/F to be executed by an operation of a menu displayed on a display unit (not illustrated) included in the communication apparatus 151. Then, the CPU 103 receives the selection of a connection I/F to be used in communication with the target communication apparatus 151, from the user. Hereinafter, the selected connection I/F will be referred to as a target I/F.

In step S206, the CPU 103 determines whether the information processing apparatus 101 has already been connected with the target communication apparatus 151 via the target I/F. Specifically, in a case where the target communication apparatus 151 has been discovered via a target I/F in step S201, the CPU 103 determines that the information processing apparatus 101 has already been connected with the target communication apparatus 151 via the target I/F. In a case where the CPU 103 determines that the information processing apparatus 101 has already been connected with the target communication apparatus 151 (YES in step S206), the processing proceeds to step S210. In a case where the CPU 103 determines that the information processing apparatus 101 has not been connected with the target communication apparatus 151 (NO in step S206), the processing proceeds to step S207. In a case where no communication apparatus 151 has been detected in step S202 and the processing proceeds to step S211, the CPU 103 determines that the information processing apparatus 101 has not been connected with the target communication apparatus 151 (NO in step S206).

In step S207, the CPU 103 executes connection processing with the target communication apparatus 151 via the target I/F. The processing in step S207 will be described below with reference to FIG. 5.

In step S208, the CPU 103 instructs an OS of the information processing apparatus 101 to search for the target communication apparatus 151 via the target I/F, and acquires a search result using a setting application. Specifically, the CPU 103 acquires information regarding the target communication apparatus 151 via the target I/F, using an API of the OS included in the information processing apparatus 101.

In step S209, the CPU 103 determines whether the target communication apparatus 151 has been detected via the target I/F. Specifically, the CPU 103 determines whether information regarding the target communication apparatus 151 has been acquired via the target I/F. In a case where the CPU 103 determines that the target communication apparatus 151 has been detected (YES in step S209), the processing proceeds to step S210. In a case where the CPU 103 determines that the target communication apparatus 151 has not been detected (NO in step S209), the processing returns to step S207, and the CPU 103 executes connection processing with the target communication apparatus 151 via the target I/F again.

Figure 3:
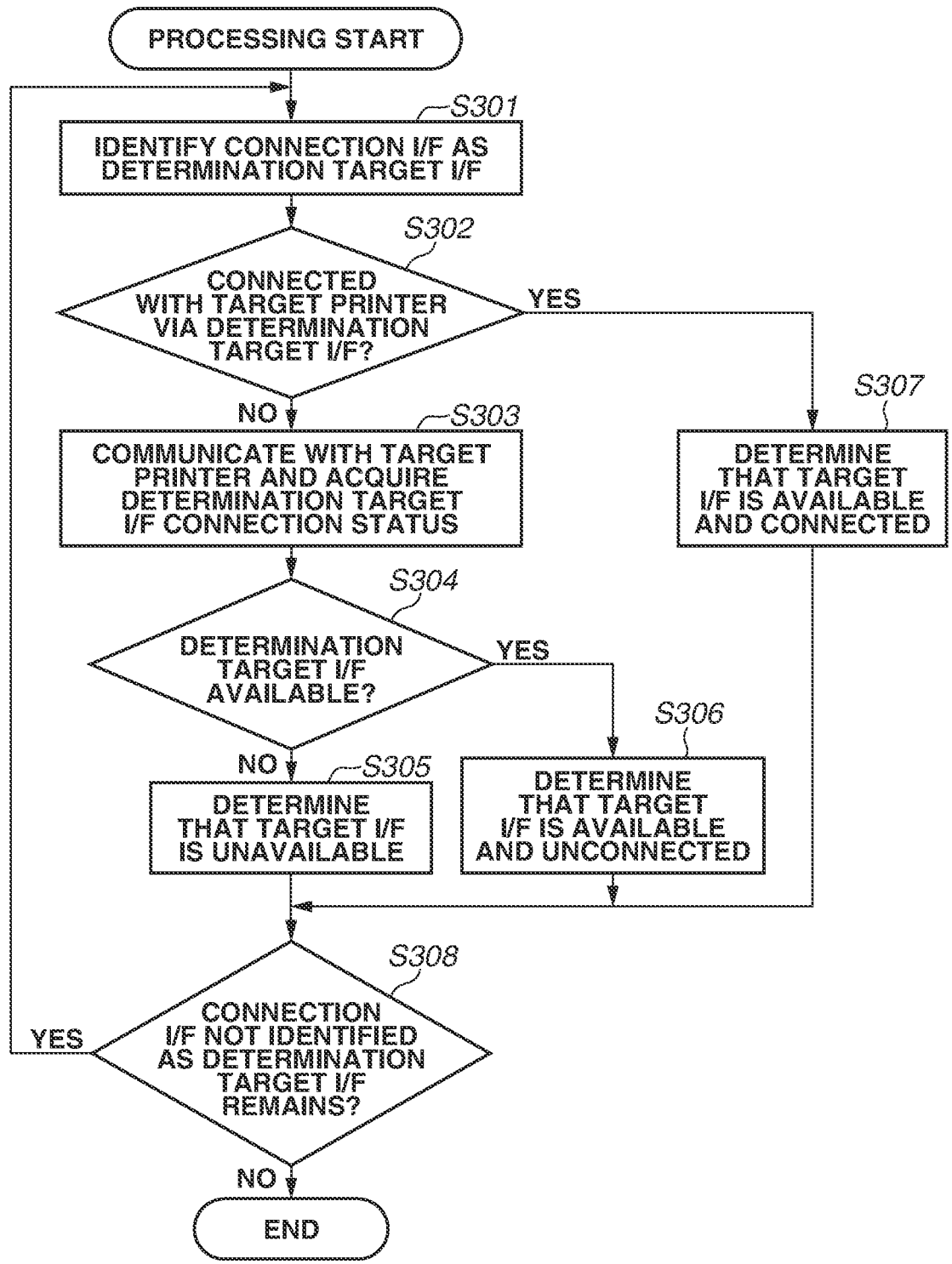
FIG. 3 is a flowchart illustrating a connectable connection interface (I/F) determination processing that is executed by the information processing apparatus.

In step S210, the CPU 103 acquires information regarding a model of the communication apparatus 151 from the discovered communication apparatus 151 via the target I/F. Then, based on the information, the CPU 103 executes processing for installing a printer driver compatible with the communication apparatus 151 to the information processing apparatus 101 and generation processing of a print queue. In other words, the CPU 103 executes the initial setting processing using the information acquired from the target communication apparatus 151 via the target I/F. After that, the CPU 103 ends the processing in the flowchart. FIG. 3 is a flowchart illustrating processing of determining a connection I/F available to the communication apparatus 151. The processing in this flowchart corresponds to the processing in step S204 of FIG. 2. The processing in the flowchart illustrated in FIG. 3 is implemented by the CPU 103 loading a setting application stored in the ROM 104 or the external storage device 106, onto the RAM 105, and executing the setting application, for example.

In step S301, the CPU 103 identifies a connection I/F (determination target I/F) that is to be determined in the flowchart. The setting application can preliminarily include fixed I/Fs, which serve as a parent population of determination target I/Fs. In the present example embodiment, a wireless LAN interface, a wired LAN interface, and a USB interface are preliminarily held as a parent population of determination target I/Fs, but determination target I/Fs are not limited to the examples. For example, in the search processing in step S201 of FIG. 2, when the CPU 103 discovers the communication apparatus 151, information regarding an I/F supported by the discovered communication apparatus 151 can also be acquired. In this case, a determination target I/F is an I/F supported by the communication apparatus 151 that has been selected in step S203 of FIG. 2. Alternatively, communication can be performed with the communication apparatus 151 selected in step S203 of FIG. 2, and an I/F supported by the selected communication apparatus 151 can be identified as a determination target I/F.

In step S302, the CPU 103 determines whether the information processing apparatus 101 has already been connected with the target communication apparatus 151 via the determination target I/F. Specifically, in a case where the target communication apparatus 151 has been discovered in step S201 via a determination target I/F, the CPU 103 determines that the information processing apparatus 101 has already been connected with the target communication apparatus 151 via the determination target I/F. In a case where the CPU 103 determines that the information processing apparatus 101 has already been connected (YES in step S302), the processing proceeds to step S307. In a case where the CPU 103 determines that the information processing apparatus 101 has not been connected (NO in step S302), the processing proceeds to step S303. In a case where the determination target I/F determined in step S302 is the determination target I/F via which the information processing apparatus 101 has already been connected with the target communication apparatus 151 (YES in step S302), and the determination target I/F is selected by the user in step S205 of FIG. 2, in step S206, the CPU 103 determines that the information processing apparatus 101 has already been connected with the target communication apparatus 151 via the target I/F.

In step S303, the CPU 103 executes communication with the communication apparatus 151 via a connection I/F, and acquires information regarding a determination target I/F. The information regarding a determination target I/F is information indicating whether the determination target I/F is a connection I/F compatible with (supported by) the communication apparatus 151, and information indicating whether communication via the determination target I/F is not disabled (is enabled) by the communication apparatus 151. Specifically, the CPU 103 generates a command (hereinafter, will be referred to as an acquisition command) for acquiring information regarding a determination target I/F, and transmits the command to the communication apparatus 151. The communication apparatus 151 generates a command (hereinafter, will be referred to as a response command) to transmit a value (hereinafter, will be referred to as a connection status value) indicating whether a determination target I/F stored in the RAM 153 is available, and transmits the command to the information processing apparatus 101. Then, the CPU 103 acquires the connection status value of the determination target I/F from the received response command. In a case where a determination target I/F is an available connection I/F, the connection status value is a value indicating a state in which a determination target I/F is available, and in a case where a determination target I/F is an unavailable connection I/F, the connection status value is a value indicating a state in which a determination target I/F is unavailable. The connection I/F available on the target communication apparatus 151 is a connection I/F compatible with the communication apparatus 151, and is a connection I/F via which communication is not disabled (is enabled). Thus, in a case where a determination target I/F is available, the connection status value is a value indicating a state in which a connection I/F is a connection I/F compatible with the communication apparatus 151 and is a connection I/F via which communication is not disabled. In a case where a determination target I/F is unavailable, the connection status value is a value indicating a state in which a connection I/F is not a connection I/F compatible with the communication apparatus 151, or a value indicating a state in which a connection I/F is a connection I/F compatible with the communication apparatus 151 but is a connection I/F via which communication is disabled.

A description will be given of a case where the target communication apparatus 151 selected in step S203 is not an apparatus discovered via a network to which the information processing apparatus 101 belongs, and is an apparatus discovered by receiving a beacon issued by activation of the network setup mode. In a case where the communication apparatus 151 that has activated the network setup mode is the target communication apparatus 151, the CPU 103 acquires information indicating whether a determination target I/F is an available connection I/F, via Wi-Fi connection established between the information processing apparatus 101 and an access point activated by the target communication apparatus 151 operating in the network setup mode. In this case, first of all, in step S303, the CPU 103 acquires information regarding an access point (hereinafter, will be referred to as a connected AP) to which the information processing apparatus 101 has wirelessly connected via Wi-Fi at least when a setting operation has been performed. The information includes information (an SSID, information about an encryption scheme, etc.) for use in connecting with an access point to which the information processing apparatus 101 is wirelessly connecting via Wi-Fi. The acquired information is stored into a predetermined storage region in a memory of the information processing apparatus 101. In a case where the information processing apparatus 101 connects with no access point via Wi-Fi when a setting operation is performed, the processing is omitted. Next, the CPU 103 tries to establish Wi-Fi connection between the information processing apparatus 101 and an access point activated by the communication apparatus 151 operating in the network setup mode. As described above, a setup communication protocol is used in communication via Wi-Fi connection between the information processing apparatus 101 and an access point activated by the communication apparatus 151 operating in the network setup mode. Then, the CPU 103 acquires information indicating whether a determination target I/F is an available connection UF, via the Wi-Fi connection between the information processing apparatus 101 and the access point activated by the communication apparatus 151 operating in the network setup mode. In a case where the target communication apparatus 151 is the communication apparatus 151 operating in the network setup mode, and a wireless LAN interface is selected in step S205 of FIG. 2 as a connection I/F to be used in communication with the target communication apparatus 151, the processing proceeds to step S207, and network setup is executed in the processing in a flowchart illustrated in FIG. 5, which will be described below. Thus, when the processing in the flowchart illustrated in FIG. 3 is ended, Wi-Fi connection between the information processing apparatus 101 and the access point activated by the communication apparatus 151 operating in the network setup mode can be continued without being disconnected. Specific network setup processing will be described below with reference to steps S503 and S504 to which the processing proceeds in a case where it is determined in steps S501 and S502 of FIG. 5 that the target communication apparatus 151 is operating in the network setup mode, and a target I/F is a wireless LAN interface (YES in steps S501 and S502).

In step S304, the CPU 103 determines whether the determination target I/F is available. That is, the CPU 103 determines whether the determination target I/F is a connection I/F compatible with the communication apparatus 151, and is a connection I/F via which communication is not disabled. Specifically, in a case where the connection status value acquired in step S302 is a value indicating a state in which the determination target I/F is a connection I/F compatible with the communication apparatus 151 and is a connection I/F via which communication is not disabled, the CPU 103 determines that the determination target I/F is an available connection I/F. In a case where the connection status value is a value indicating a state in which the determination target I/F is not a connection I/F compatible with the communication apparatus 151, or a value indicating a state in which the determination target I/F is a connection I/F compatible with the communication apparatus 151 but is a connection I/F via which communication is disabled, the CPU 103 determines that the determination target I/F is an unavailable connection I/F. In a case where the CPU 103 determines that the determination target I/F is an available connection I/F (YES in step S304), the processing proceeds to step S306. In a case where the CPU 103 determines that the determination target I/F is an unavailable connection I/F (NO in step S304), the processing proceeds to step S305.

In step S305, the CPU 103 determines that the determination target I/F is a connection I/F that has not been connected with the communication apparatus 151 and is an unavailable connection I/F. Thus, on the display of the notification in step S205 of FIG. 2, the CPU 103 provides, to a connection I/F determined as a connection I/F not connecting with the communication apparatus 151 and determined as an unavailable connection I/F, information indicating a state in which the connection I/F is unavailable. Alternatively, the unavailable connection I/F can be omitted from choices on the display of the notification.

In step S306, the CPU 103 determines that the determination target I/F is a connection I/F not connecting with the communication apparatus 151 and is an available connection I/F. Thus, on the display of the notification in step S205 of FIG. 2, a connection I/F determined as a connection I/F not having been used in establishing connection with the communication apparatus 151 and determined as an available connection I/F becomes selectable as a connection I/F to be used by the user in communication with the target communication apparatus 151.

In step S307, the CPU 103 determines that connection with the communication apparatus 151 has been established via the determination target I/F, and the determination target I/F is an available connection I/F.

Thus, in the notification displayed in step S205 of FIG. 2, a connection I/F determined as a connection I/F connecting with the communication apparatus 151 and determined as an available connection I/F becomes selectable as a connection I/F to be used by the user in communication with the target communication apparatus 151.

In step S308, the CPU 103 determines whether a connection I/F not identified as a determination target I/F remains among connection I/Fs compatible with the communication apparatus 151. In a case where the CPU 103 determines that a connection I/F remains (YES in step S308), the processing returns to step S301, and the CPU 103 executes the processing in this flowchart on the unidentified connection I/F. In a case where the CPU 103 determines that a connection I/F not identified as a determination target I/F does not remain (NO in step S308), the CPU 103 ends the processing in the flowchart.

In the flowchart, in a case where the CPU 103 determines that the information processing apparatus 101 has already been connected with the target communication apparatus 151 via the determination target I/F (YES in step S302), the processing proceeds to step S307, and the CPU 103 further determines that connection with the communication apparatus 151 has been established via the determination target I/F and the determination target I/F is an available connection I/F. However, the processing in step S302 can be omitted. In this case, the processing in steps S303 and S304 is executed irrespective of whether the information processing apparatus 101 has already been connected with the target communication apparatus 151 via the determination target I/F, and determination of whether the determination target I/F is available is performed based on information regarding the determination target I/F.

The processing in the flowchart illustrated in FIG. 3 is processing that is executed on the communication apparatus 151 in a state in which connection with the information processing apparatus 101 has been established via any connection I/F (i.e., the processing is executed on the communication apparatus 151 detected in communication via any connection I/F). For example, the processing is executed in a case where determination of whether communication via a USB interface is available on the communication apparatus 151 detected in communication via a wireless LAN interface is performed. In this case, the CPU 103 performs transmission of an acquisition command and reception of a response command by the communication with the communication apparatus 151 via the wireless LAN interface. For example, in the communication via the wireless LAN interface, an SNMP can be used as a communication protocol. In a case where communication is performed in compliance with the SNMP, information indicating whether communication via the determination target I/F is available is stored as device information called a management information base (MIB).

The processing in the flowchart illustrated in FIG. 3 is processing that is executed on the communication apparatus 151 operating in the above-described network setup mode. Thus, the transmission of an acquisition command to and the reception of a response command from the communication apparatus 151 are performed by communication via Wi-Fi connection between the information processing apparatus 101 and an access point activated by the communication apparatus 151 operating in the network setup mode. The communication apparatus 151 operating in the network setup mode can even be in a state in which connection with the communication apparatus 151 has been established via any connection UF. Then, the transmission of an acquisition command and the reception of a response command can be performed by communication with the communication apparatus 151 via the connection UF.

FIG. 5 is a flowchart illustrating processing for establishing connection with the target communication apparatus 151 via a target I/F. The processing in the flowchart corresponds to the processing in step S207 of FIG. 2. The processing in the flowchart illustrated in FIG. 5 is implemented by the CPU 103 loading a setting application stored in the ROM 104 or the external storage device 106, onto the RAM 105, and executing the setting application, for example.

In step S501, the CPU 103 determines whether the target communication apparatus 151 is operating in the network setup mode. As described above, the setting application preliminarily recognizes that an SSID including a predetermined character string is issued from a communication apparatus operating in the network setup mode. Thus, by determining whether an SSID including a predetermined character string has been discovered, the CPU 103 can execute the processing in step S501. A state in which the communication apparatus 151 is operating in the network setup mode is a state in which a wireless LAN interface is activated. In a case where the CPU 103 determines that the target communication apparatus 151 is operating in the network setup mode (YES in step S501), the processing proceeds to step S502. In a case where the CPU 103 determines that the target communication apparatus 151 is not operating in the network setup mode (NO in step S501), the processing proceeds to step S508. In a case where no communication apparatus 151 has been detected in step S202 of FIG. 2 (NO in step S202), the CPU 103 determines that the target communication apparatus 151 is not operating in the network setup mode (NO in step S501).

In step S502, the CPU 103 determines whether the target I/F is a wireless LAN interface. In a case where the CPU 103 determines that the target I/F is a wireless LAN interface (YES in step S502), the processing proceeds to step S503. In a case where the CPU 103 determines that the target I/F is a not wireless LAN interface (NO in step S502), the processing proceeds to step S505. In a case where the CPU 103 determines that the target I/F is a wireless LAN interface (YES in step S502), the above-described network setup is executed on the target communication apparatus 151.

In step S503, the CPU 103 transmits information regarding the connected AP that is stored in step S303 of FIG. 3, to the target communication apparatus 151. Specifically, in the processing, the CPU 103 can request a list of access points from the communication apparatus 151. Then, in a case where a received list includes the connected AP, the CPU 103 transmits connection information on the connected AP. In a case where the received list does not include the connected AP, the CPU 103 displays the received list on the display unit 108, and receives user's selection of an access point from among the list. Then, the information processing apparatus 101 transmits connection information on the selected access point. The configuration is not limited to this configuration. The CPU 103 can display the list each time to receive user's selection of an access point. Before connection information is transmitted, the CPU 103 receives, from the user, an entry of a password for connection with an access point via a screen displayed by the setting application. Then, the CPU 103 includes the received password into connection information, and transmits the connection information. In step S503, the CPU 103 can transmit a connection request for direct connection with the communication apparatus 151, to the communication apparatus 151 via Wi-Fi connection between the information processing apparatus 101 and the communication apparatus 151 operating in the network setup mode. In this case, the communication apparatus 151 transmits connection information on an access point that is activated in the communication apparatus 151 at the time of the P2P mode, to the information processing apparatus 101, ends the network setup mode, and shifts to the P2P mode. Then, the CPU 103 establishes P2P connection with the communication apparatus 151 using the received connection information. In the processing, a network to which the information processing apparatus 101 belongs is a network formed by the access point activated in the communication apparatus 151.

In step S504, the CPU 103 issues an instruction to disconnect Wi-Fi connection between the information processing apparatus 101 and the access point activated by the communication apparatus 151 operating in the network setup mode. Then, the CPU 103 reestablishes connection between the connected AP and the information processing apparatus 101. The configuration is not limited to this configuration. For example, in a case where the information processing apparatus 101 transmits, to the communication apparatus 151, connection information on another access point different from an access point to which the information processing apparatus 101 has connected via Wi-Fi when a setting operation has been performed, the information processing apparatus 101 can connect with the different access point. After that, the CPU 103 ends the processing in this flowchart.

In step S505, which is the processing of a case where the CPU 103 determines that the target I/F is a not wireless LAN interface (NO in step S502), the CPU 103 transmits an instruction for enabling communication via the target I/F, to the communication apparatus 151 via Wi-Fi connection between the information processing apparatus 101 and an access point activated by the communication apparatus 151 operating in the network setup mode. Specifically, the CPU 103 generates a command for causing the communication apparatus 151 to enable communication via the target I/F (USB interface or wired LAN interface in this example), and transmits the command to the communication apparatus 151. The communication apparatus 151 checks the received command and activates the target I/F. Then, the communication apparatus 151 ends the network setup mode. In a case where the target communication apparatus 151 can enable both of communication via a wireless LAN interface and communication via a wired LAN interface or a USB interface, the communication apparatus 151 can remain in the network setup mode. In a case where the target I/F is a USB interface, and communication via a USB interface is enabled by insertion of a USB cable, for example, there is no need to transmit an instruction for enabling communication via a USB interface.

In step S506, the CPU 103 issues an instruction to disconnect Wi-Fi connection between the information processing apparatus 101 and an access point activated by the communication apparatus 151 operating in the network setup mode. Then, the CPU 103 reestablishes connection between the connected AP and the information processing apparatus 101.

Figure 6:
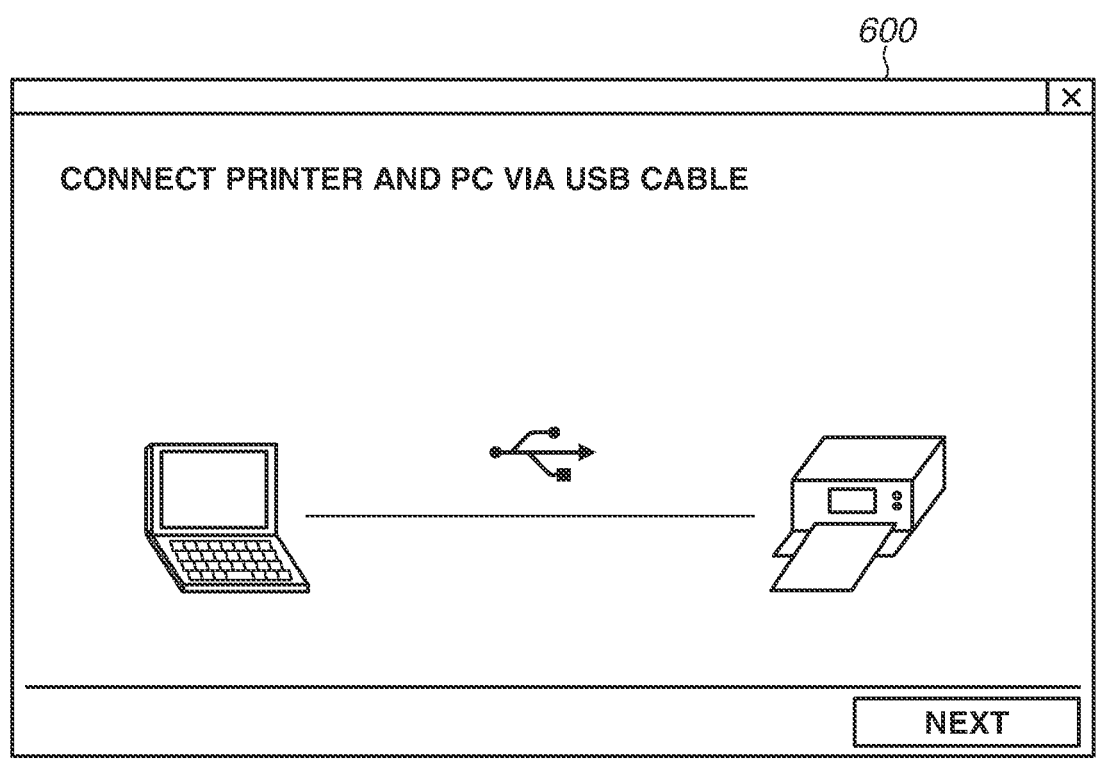
FIG. 6 is a diagram illustrating an example of a notification screen that is displayed in processing of connecting with the communication apparatus via the target UF.

In step S507, the CPU 103 displays a notification for prompting the user to execute an operation necessary for establishing connection with the target communication apparatus 151 via the target I/F. For example, in a case where the target I/F is a USB interface, the CPU 103 displays a notification for prompting the user to connect the target communication apparatus 151 and the information processing apparatus 101 via a USB cable. Specifically, the CPU 103 displays a notification screen 600 as illustrated in FIG. 6, on the display unit 108. After that, the CPU 103 ends the processing in this flowchart. For example, identification information (serial number, media access control (MAC) address, etc.) of the target communication apparatus 151 can be displayed on the notification screen. For example, the notification screen 600 can include a region for describing the details of an operation for executing communication via the target I/F, or a software button for newly displaying the region. In a case where the software button is pressed, for example, the region is displayed on a web browser as internet content. This is because the information processing apparatus 101 is enabled to execute internet communication since the information processing apparatus 101 has reestablished connection with the connected AP in step S506.

In a case where the CPU 103 determines that the target communication apparatus 151 is not operating in the network setup mode (NO in step S501), the processing proceeds to step S508, in which the CPU 103 displays a notification for prompting the user to execute an operation necessary for establishing connection with the target communication apparatus 151 via the target I/F. Because the processing is processing similar to the processing in step S507, the redundant description will be omitted.

As described above, in the present example embodiment, the CPU 103 determines whether a connection I/F is a connection I/F compatible with the communication apparatus 151, and is a connection I/F via which communication is not disabled by the communication apparatus 151, based on information regarding the connection I/F that has been acquired in the communication with the communication apparatus 151. Then, the CPU 103 executes notification processing for prompting the user to select a connection I/F to be used in communication with the target communication apparatus 151, from among connection I/Fs that are determined as connection I/Fs compatible with the communication apparatus 15 land determined as connection I/Fs via which communication is not disabled by the communication apparatus 151.

This can reduce the possibility that a connection I/F selected by the user is a predetermined connection I/F via which communication is disabled by the communication apparatus 151. Furthermore, the user can recognize a connection I/F via which communication is not disabled by the communication apparatus 151, whereby it is possible to reduce the possibility of selecting a connection I/F via which communication is disabled by the communication apparatus 151.

In a case where it is determined that connection with the target communication apparatus 151 is not established via the target I/F being a connection I/F selected by the user, the CPU 103 executes notification processing for establishing connection with the target communication apparatus 151 via the target I/F. This enhances usability in establishing connection with the target communication apparatus 151 via the target I/F.

In the first example embodiment, the user is notified of a connection I/F which is compatible with the communication apparatus 151 and via which communication is not disabled by the communication apparatus 151. In a second example embodiment, the description will be given of a case where the communication apparatus 151 sets connection authority, which is required when connection with the communication apparatus 151 is established via a connection I/F, depending on the type of the connection I/F. Specifically, for example, while an administrator account can perform communication with the communication apparatus 151 via any connection I/Fs, an account with low authority (for example, guest account) is sometimes permitted to perform communication with the communication apparatus 151 only via a USB interface. This is intended to prevent a guest account from changing a network setting, for example. As for a connection I/F for which connection authority is set, even if the connection I/F is a connection I/F via which communication is not disabled by the communication apparatus 151, administrator authentication might be required. In the present example embodiment, processing of determining whether connection authority is set for a connection I/F, in addition to determination of whether the connection I/F is available to the user will be described. Hereinafter, a difference from the first example embodiment will be mainly described.

Figure 7:
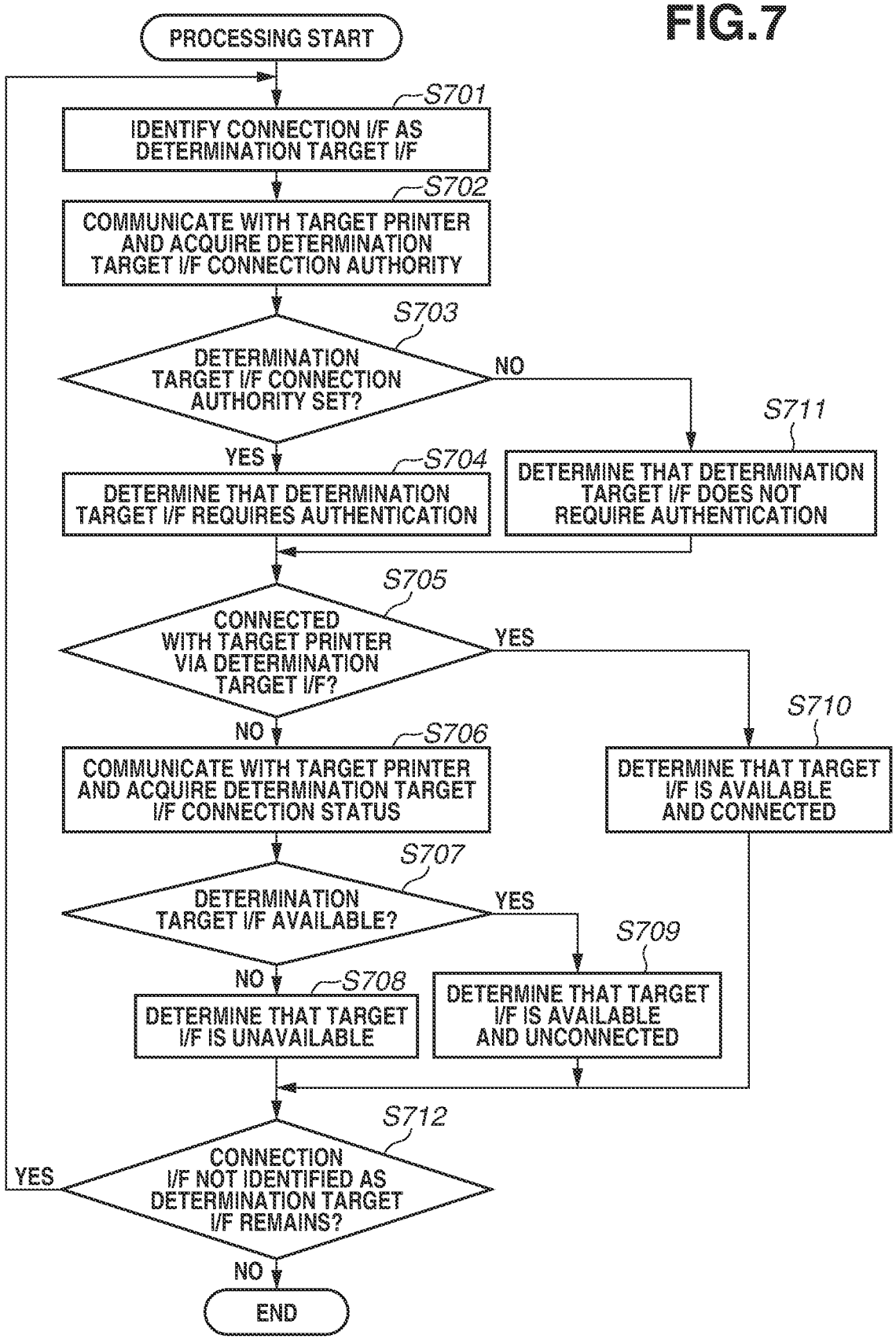
FIG. 7 is a flowchart illustrating available connection I/F determination processing of that is executed by the information processing apparatus.

FIG. 7 is a flowchart illustrating processing of determining a connection I/F available to the communication apparatus 151. The processing in this flowchart corresponds to the processing in step S204 of FIG. 2. The processing in the flowchart illustrated in FIG. 7 is implemented by the CPU 103 loading a setting application stored in the ROM 104 or the external storage device 106, onto the RAM 105, and executing the setting application, for example.

Because the processing in step S701 is processing similar to the processing in step S301, the redundant description will be omitted.

In step S702, the CPU 103 executes communication with the communication apparatus 151 via any connection I/F, and acquires information indicating whether connection authority is set for a determination target I/F. Specifically, the CPU 103 generates a command (hereinafter, will be referred to as a connection authority information acquisition command) to acquire information indicating whether connection authority is set for a determination target I/F, and transmits the command to the communication apparatus 151. The communication apparatus 151 generates a command (hereinafter, will be referred to as a connection authority response command) to transmit a value (hereinafter, a value indicating connection authority) indicating whether connection restriction is set for a determination target I/F that is stored in the RAM 153, and transmits the command to the information processing apparatus 101. Then, the CPU 103 acquires a value indicating connection authority of the determination target I/F, from the received connection authority information response command. In a case where connection authority is set for the determination target I/F, the value indicating connection authority is a value indicating a state in which connection authority is set, and in a case where connection authority is not set for the determination target I/F, the value indicating connection authority is a value indicating a state in which connection authority is not set. In a case where connection authority is set for a connection I/F, for example, administrator authentication is required when communication via the connection I/F is performed. Thus, in a case where connection authority is set for the determination target I/F, the value indicating connection authority can be a value indicating a state in which administrator authentication is required, and in a case where connection authority is not set for the determination target I/F, the value indicating connection authority can be a value indicating a state in which administrator authentication is not required.

In step S703, the CPU 103 determines whether connection authority is set for the determination target I/F. Specifically, in a case where the value indicating connection authority that has been acquired in step S702 is a value indicating a state in which connection authority is set, the CPU 103 determines that connection authority is set for the determination target I/F. In a case where the value indicating connection authority is a value indicating a state in which connection authority is not set, the CPU 103 determines that connection authority is not set for the determination target I/F. The CPU 103 can determine whether the determination target I/F requires administrator authentication. Specifically, in a case where the value indicating connection authority that has been acquired in step S702 is a value indicating a state in which administrator authentication is required, the CPU 103 determines that the determination target I/F requires administrator authentication. In a case where the value indicating connection authority is a value indicating a state in which administrator authentication is not required, the CPU 103 determines that the determination target I/F does not require administrator authentication. In a case where the CPU 103 determines that connection authority is set for the determination target I/F (YES in step S703), the processing proceeds to step S704. In a case where the CPU 103 determines that connection authority is not set for the determination target I/F (NO in step S703), the processing proceeds to step S711.

In step S704, the CPU 103 determines that the determination target I/F is a connection I/F for which connection authority is set. Alternatively, the CPU 103 can determine that the determination target I/F is a connection I/F requiring administrator authentication.

In step S711, the CPU 103 determines that the determination target I/F is not a connection I/F for which connection authority is set. Alternatively, the CPU 103 can determine that the determination target I/F is a connection I/F not requiring administrator authentication.

Because the processing in step S705 is processing similar to the processing in step S302, the redundant description will be omitted. In a case where the CPU 103 determines that the information processing apparatus 101 has already been connected with the target communication apparatus 151 via the determination target I/F (YES in step S705), the processing proceeds to step S710. In a case where the CPU 103 determines that the information processing apparatus 101 has not been connected with the target communication apparatus 151 (NO in step S705), the processing proceeds to step S706.

Because the processing in steps S706 to S710 and S712 is processing similar to the processing in steps S303 to S308, the redundant description will be omitted. In a case where the CPU 103 determines that a connection I/F not identified as a determination target I/F remains (YES in step S712), the processing returns to step S701, and the CPU 103 executes the processing in this flowchart on the unidentified connection I/F. In a case where the CPU 103 determines that a connection I/F not identified as a determination target I/F does not remain (NO in step S712), the CPU 103 ends the processing in this flowchart.

Figure 8:
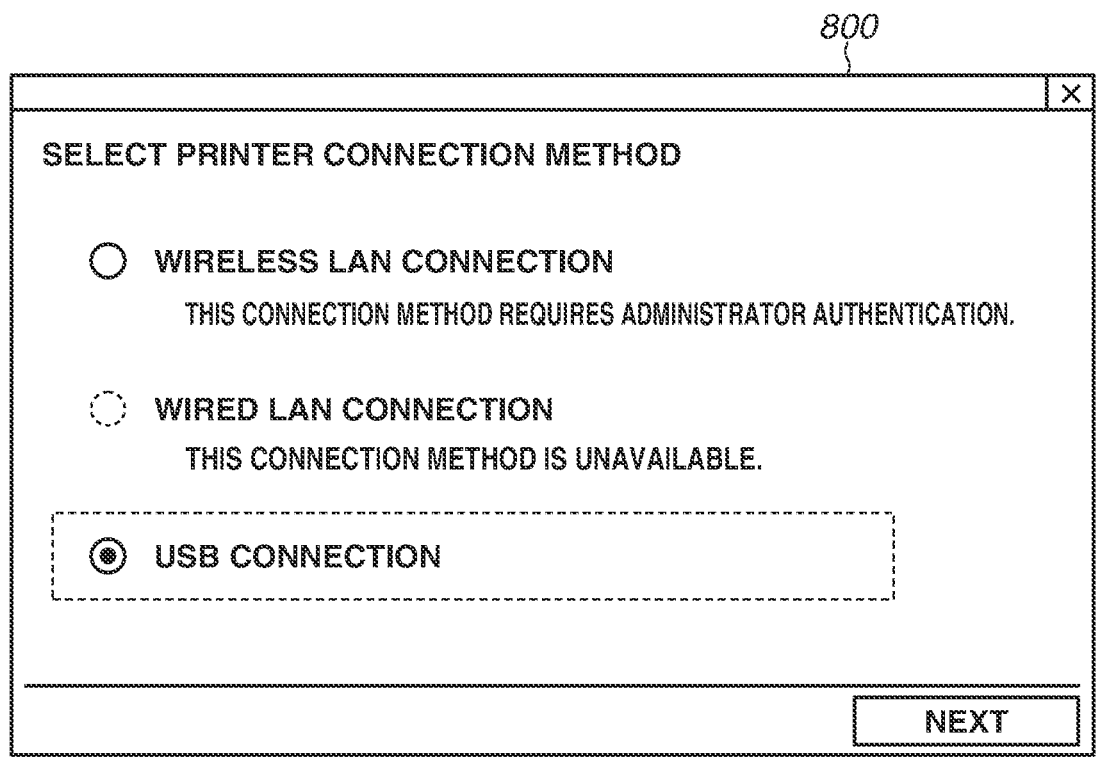
FIG. 8 illustrates an example of a connection I/F selection screen.

In step S205 of FIG. 2, the CPU 103 displays, on the display unit 108 (outputs to the display unit 108), a notification for prompting a user to select a connection I/F to be used in communication with the target communication apparatus 151, from among connection I/Fs determined in the processing in the flowchart in FIG. 7 (step S204 of FIG. 2) as connection I/Fs available on the target communication apparatus 151. Furthermore, in the notification, the CPU 103 provides information indicating a state in which connection authority is set, to a connection I/F for which connection authority is set. For example, in a case where the CPU 103 determines in step S204 that the communication apparatus 151 can use a wireless LAN interface, but administrator authentication is required, the CPU 103 adds information indicating a state in which administrator authentication is required, to a choice of wireless LAN connection. Then, in a case where the user selects a connection I/F requiring administrator authentication, the CPU 103 display an administrator authentication screen. A notification screen can include a software button for opening the administrator authentication screen, for example, and the administrator authentication screen can be displayed in response to a pressing operation on the software button. Furthermore, in a case where the CPU 103 determines in the processing in the flowchart in FIG. 7 (step S204 of FIG. 2) that the communication apparatus 151 cannot use a wired LAN interface, for example, a message notifying that wired LAN connection is unavailable, and a choice of wired LAN connection that is in an unselectable state are displayed in the notification. FIG. 8 illustrates an example of a notification for prompting the user to select a connection I/F to be used in communication with the target communication apparatus 151, from among connection I/Fs determined as available connection I/Fs. While a notification screen 800 is a selection screen including radio buttons, the notification screen 800 can have a drop-down list or use another selection method, and a display state of an unavailable connection I/F can be changed to a nondisplayed state. In a case where the communication apparatus 151 includes a switch for controlling enabling or disabling of communication via a connection I/F, and the user can operate the switch, for example, description notifying that a switch of a connection I/F unavailable on the communication apparatus 151 is turned off can be displayed on the notification screen 800. Furthermore, the notification screen 800 can include a region for describing the details of an operation for turning on the switch, or a software button for newly displaying the region, for example. In a case where the software button is pressed, for example, the region can be displayed on a web browser as internet content. The switch needs not be a physical button, and control of enabling or disabling of communication via a connection I/F can be executed by an operation on a menu displayed on a display unit (not illustrated) included in the communication apparatus 151.

As described above, in the present example embodiment, the CPU 103 determines whether connection authority is set for a connection I/F, in addition to determination of whether the connection I/F is a connection I/F available to the communication apparatus 151. Then, the CPU 103 executes notification processing for prompting the user to select a connection I/F to be used in communication with the target communication apparatus 151. In the notification, a state in which administrator authentication is required is displayed for a connection I/F for which connection authority is set, among available connection I/Fs. This can reduce the possibility that a connection I/F selected by the user is a predetermined connection I/F via which communication is disabled by the communication apparatus 151. In addition, a connection I/F requiring administrator authentication becomes recognizable. Furthermore, the user who is not an administrator can recognize a connection I/F via which communication is disabled by the communication apparatus 151 and a connection I/F requiring administrator authentication, and it is possible to reduce the possibility of selecting a connection I/F via which communication is disabled by the communication apparatus 151 and a connection I/F requiring administrator authentication.

Other Example Embodiments

In the above-described example embodiments, the description has been given of a configuration in which Wi-Fi communication is used as both of a communication method in the transmission of information regarding a connected AP and a communication method in establishing connection between the information processing apparatus 101 and the communication apparatus 151. Nevertheless, a communication method in the transmission of information regarding a connected AP and a communication method in establishing connection between the information processing apparatus 101 and the communication apparatus 151 can be different from each other. For example, a communication method in the transmission of information regarding a connected AP can be Bluetooth® Classic or Bluetooth® LE, and a communication method in establishing connection between the information processing apparatus 101 and the communication apparatus 151 can be Wi-Fi communication. In this case, the information processing apparatus 101 can establish connection between the information processing apparatus 101 and the communication apparatus 151 without disconnecting connection with the connected AP.

In the above-described example embodiments, in a case where one or more communication apparatuses 151 have been detected in step S202 of FIG. 2, the processing of receiving the selection of the communication apparatus 151 targeted in the initial setting processing is executed, but the configuration is not limited to this configuration. For example, in a case where the number of the detected communication apparatuses 151 is one, the information processing apparatus 101 can determine the detected communication apparatus 151 as the communication apparatus 151 targeted in the initial setting processing. In this case, the processing in step S203 to output a notification for receiving the selection of the target communication apparatus 151 can be omitted.

In the above-described example embodiments, in step S205 of FIG. 2, the CPU 103 displays connection I/Fs on the display unit 108, and receives the selection of a connection I/F to be used in communication with the target communication apparatus 151, from the user, but the configuration is not limited to this configuration. For example, in a case where the number of connection I/Fs determined in the processing in step S204 as available connection I/Fs is one, the CPU 103 can determine the connection I/F as a connection I/F to be used in communication with the target communication apparatus 151. Furthermore, for example, in some cases, the number of connection I/Fs determined by the CPU 103 in the processing in step S204 as available connection I/Fs is two, but the number of connection I/Fs determined to be a determination target I/F via which the information processing apparatus 101 has already been connected with the target communication apparatus 151, in the processing in step S302 of FIG. 3 is one.

In this case, the connection I/F determined as a determination target I/F via which the information processing apparatus 101 has already been connected with the target communication apparatus 151 can be set as a connection I/F to be used in communication with the target communication apparatus 151. In the example cases, outputting a notification to receive the selection of a target I/F can be omitted in step S205.

In the above-described example embodiments, even if a connection I/F is determined in step S204 of FIG. 2 as a connection I/F available on the communication apparatus 151, in a case where the connection I/F is a connection I/F unavailable on the information processing apparatus 101, the CPU 103 can display a message notifying that the connection I/F is unavailable. For example, in a case where the information processing apparatus 101 cannot use wired LAN connection, a message notifying that wired LAN connection is unavailable, and a choice of wired LAN connection that is an unselectable state can be displayed. The display of the choice of wired LAN connection can be omitted from the notification.

In the notification in the above-described example embodiments, for example, the CPU 103 can display a notification in a state in which a radio button of a connection I/F displayed in an upper part is selected from among available connection I/Fs. If the number of connection I/Fs not requiring administrator authentication is one, the CPU 103 can display a notification in a state in which the connection I/F is selected. In a case where the number of connection I/Fs not requiring administrator authentication is two or more, the CPU 103 can display a notification in a state in which a radio button of a connection I/F displayed in an upper part is selected. The configuration is not limited to this. The CPU 103 can display a notification in a state in which a connection I/F determined in step S302 as a connection I/F via which the information processing apparatus 101 has already been connected with the communication apparatus 151 is selected.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-189028, filed Nov. 19, 2021, which is hereby incorporated by reference herein in its entirety.

What is claimed is:

1. A non-transitory computer-readable storage medium storing instructions for causing a computer of an information processing apparatus to execute a process comprising:
    a first acquisition of acquiring, via communication with the communication apparatus, interface information regarding at least one interface usable by the communication apparatus;
    a first displaying of displaying a screen including at least one option corresponding to the at least one interface corresponding to the interface information acquired in the first acquisition,
    wherein in a case where the communication apparatus is capable of using a wireless LAN interface for communication by a wireless LAN, the at least one option includes an option corresponding to the wireless LAN interface; and
    an execution of executing processing for transmitting information about an external access point that is arranged outside of the communication apparatus and outside of the information processing apparatus to the communication apparatus in a case where the option corresponding to the wireless LAN interface is selected on the screen.

2. An information processing apparatus comprising:
a first acquisition unit configured to acquire, via communication with the communication apparatus, interface information regarding at least one interface usable by the communication apparatus;
a first display unit displaying a screen including at least one option corresponding to the at least one interface corresponding to the interface information acquired by the first acquisition unit,
wherein in a case where the communication apparatus is capable of using a wireless LAN interface for communication by a wireless LAN, the at least one option includes an option corresponding to the wireless LAN interface; and
an execution unit configured to execute processing for transmitting information about an external access point that is arranged outside of the communication apparatus and outside of the information processing apparatus to the communication apparatus in a case where the option corresponding to the wireless LAN interface is selected on the screen.

3. A control method of an information processing apparatus, the control method comprising:
a first acquisition of acquiring, via communication with the communication apparatus, interface information regarding at least one interface usable by the communication apparatus; and
a first displaying of displaying a screen including at least one option corresponding to the at least one interface corresponding to the interface information acquired in the first acquisition,
wherein in a case where the communication apparatus is capable of using a wireless LAN interface for communication by a wireless LAN, the at least one option includes an option corresponding to the wireless LAN interface; and
an execution of executing processing for transmitting information about an external access point that is arranged outside of the communication apparatus and outside of the information processing apparatus to the communication apparatus in a case where the option corresponding to the wireless LAN interface is selected on the screen.

4. The non-transitory computer-readable storage medium according to claim 1, wherein the process further comprises executing search processing to search for the communication apparatus via an interface corresponding to the option selected on the screen.

5. The non-transitory computer-readable storage medium according to claim 4,
wherein in a case where the communication apparatus is not connected to the information processing apparatus via an interface corresponding to the option selected on the screen, the search processing is executed, and
wherein in a case where the communication apparatus is connected to the information processing apparatus via the interface corresponding to the option selected on the screen, the search processing is not executed.

6. The non-transitory computer-readable storage medium according to claim 4, wherein in a case where the interface corresponding to the option selected on the screen is the option corresponding to the wireless LAN interface, the search processing is executed after the information about the external access point is transmitted to the communication apparatus.

7. The non-transitory computer-readable storage medium according to claim 6, wherein in a case where the interface corresponding to the option selected on the screen is the option corresponding to the wireless LAN interface, the search processing is executed after the information about the external access point is transmitted to the communication apparatus and the external access point is connected to the information processing apparatus.

8. The non-transitory computer-readable storage medium according to claim 6,
wherein in a case where the communication apparatus is capable of using another interface different from the wireless LAN interface, the at least one option includes an option corresponding to the other interface, and
wherein in a case where the option corresponding to the other interface is selected on the screen, the search processing is executed without executing processing to transmit the information about the external access point to the communication apparatus.

9. The non-transitory computer-readable storage medium according to claim 8, wherein the other interface is a wired LAN interface or a USB interface for the communication apparatus to communicate by USB.

10. The non-transitory computer-readable storage medium according to claim 6, storing a program for further causing the computer to execute execution of executing processing to install a driver corresponding to the communication apparatus in a case where the communication apparatus is detected by the search processing.

11. The non-transitory computer-readable storage medium according to claim 6, storing a program for further causing the computer to execute execution of executing processing to generate a print queue based on information acquired from the communication apparatus in a case where the communication apparatus is detected by the search processing.

12. The non-transitory computer-readable storage medium according to claim 1,
wherein in a case where the communication apparatus is capable of using another interface different from the wireless LAN interface, the at least one option includes an option corresponding to the other interface, and
wherein in a case where the option corresponding to the other interface is selected on the screen but the communication apparatus is not connected to the information processing apparatus, a notification to establish a connection between the communication apparatus and the information processing apparatus via the other interface is executed.

13. The non-transitory computer-readable storage medium according to claim 12, wherein in a case where the option corresponding to the other interface is selected on the screen and the communication apparatus is connected to the information processing apparatus, the notification is not executed.

14. The non-transitory computer-readable storage medium according to claim 12, wherein the other interface is a wired LAN interface or a USB interface for the communication apparatus to communicate by USB.

15. The non-transitory computer-readable storage medium according to claim 1, wherein control is performed so that an interface unusable by the communication apparatus is not selectable on the screen.

16. The non-transitory computer-readable storage medium according to claim 15, wherein the interface unusable by the communication apparatus is a wired LAN interface or a USB interface for the communication apparatus to communicate by USB.

17. The non-transitory computer-readable storage medium according to claim 1, that stores instructions for further causing the computer to execute search of executing search processing to search for the communication apparatus with which the information processing apparatus is capable of communicating, and
wherein the interface information is acquired from the communication apparatus detected by the search processing.

18. The non-transitory computer-readable storage medium according to claim 1, storing a program for further causing the computer to execute display of displaying a screen including a plurality of options corresponding to a plurality of interfaces including the wireless LAN interface without acquiring the interface information in a case where the communication apparatus is not detected by the search processing.

19. The non-transitory computer-readable storage medium according to claim 1, wherein the communication apparatus is a printer.

* * * * *